United States Patent [19]
Dwyer

[11] Patent Number: 6,154,929
[45] Date of Patent: Dec. 5, 2000

[54] SUCTION CUP MOUNTED HOLDER FOR USE WITH WATERCRAFT

[76] Inventor: William F. Dwyer, 3580 66th Ter. N., Pinellas Park, Fla. 33781

[21] Appl. No.: 09/237,477

[22] Filed: Jan. 26, 1999

[51] Int. Cl.$^7$ .................................................. A45C 13/22
[52] U.S. Cl. ....................... 16/422; 294/64.1; 248/205.6; 248/206.2
[58] Field of Search .............................. 16/422; 294/64.1, 294/65; 248/362, 363, 205.5, 206.2, 206.4, 683; 277/634, 635

[56] References Cited

U.S. PATENT DOCUMENTS

| | | | |
|---|---|---|---|
| 1,845,196 | 2/1932 | Schaff | 248/205.5 |
| 4,091,945 | 5/1978 | Patterson | 294/64.1 |
| 4,328,761 | 5/1982 | Dwyer | 16/422 |
| 4,585,026 | 4/1986 | Norton | 277/634 |
| 4,932,701 | 6/1990 | Cornillier et al. | 294/64.1 |
| 5,050,918 | 9/1991 | Kolze | 294/64.1 |
| 5,639,134 | 6/1997 | Rusch et al. | 294/64.1 |
| 5,983,556 | 11/1999 | Zaloga | 43/57.1 |

FOREIGN PATENT DOCUMENTS

| | | | |
|---|---|---|---|
| 667733 | 3/1952 | United Kingdom | 248/206.2 |

*Primary Examiner*—Chuck Y. Mah
*Attorney, Agent, or Firm*—Ronald E. Smith; Smith & Hopen, P.A.

[57] ABSTRACT

A device that enables a person positioned in a body of water to hold onto the exterior hull surface of a watercraft. A handle has a straight central part and a pair of parallel arms that are perpendicular to the central part and which extend from opposite ends of the central part in a common direction. Each of the parallel arms has a distal free end that engages a suction cup on its convex side. An O-ring is integrally formed with each suction cup on its concave side, and is positioned on the outermost peripheral edge of its associated suction cup. The O-ring increases the volumetric capacity of the suction cup and therefore increases the strength of the vacuum that holds the suction cup to the watercraft.

3 Claims, 2 Drawing Sheets

SUCTION CUP MOUNTED HOLDER FOR USE WITH WATERCRAFT

BACKGROUND OF THE INVENTION

1. Field of the Invention

This invention relates, generally, to devices that enable a person in water, such as a swimmer or a diver, to hold onto the exterior hull of a watercraft such as a boat. More particularly, it relates to a moveable suction cup-mounted holder having suction cups with enhanced gripping power.

2. Description of the Prior Art

There are a number of situations when a person positioned in a body of water may need to grab onto the exterior hull surface of a watercraft. A maintenance person may need to clean the waterline or bottom of a boat, for example, and there may be no handrail that may be grasped during the cleaning job. Another example can be found when there is a need to work on the boat's propeller; again, no handholds may be available to provide something to hold onto while working. A swimmer approaching a boat may also need a hand hold to climb out of the water and onto the boat.

Most of the hand holds heretofore developed require puncturing of the hull.

The most relevant prior art to the present invention is U.S. Pat. No. 4,328,761 to the present inventor entitled "Suction Cup Mounted Holder For Water Craft." The holder disclosed in that patent performs its intended function without requiring hull-puncturing, but the suction cups are of conventional design.

There is a need, then, for a moveable handle having improved suction cups so that the holding power of the handle is enhanced.

However, it was not obvious to those of ordinary skill in this art how the needed improvement could be provided, in view of the art considered as a whole at the time the present invention was made.

SUMMARY OF THE INVENTION

The long-standing but heretofore unfulfilled need for an innovation that overcomes the limitations of the prior art is now met by a new, useful, and nonobvious invention. The present invention includes a holder or handle that enables a person in a body of water to hold onto an exterior surface of a hull of a watercraft. The novel handle includes a straight central part and a pair of transversely opposed, parallel arms that are perpendicular to the central part and which extend from the central part in a common direction. The novel handle further includes a pair of suction cups of improved construction. Each of the parallel arms has a distal free end that engages a suction cup on a convex side thereof, and an O-ring is secured to each suction cup on a concave side thereof. Each O-ring is positioned on the outermost peripheral edge of its associated suction cup. Accordingly, each O-ring increases the volumetric capacity of its respective suction cup and therefore increases the strength of the vacuum that holds the suction cup to the boat. Each 0-ring may be integrally formed with its associated suction cup or it may be secured thereto by any suitable means such as an adhesive.

It is a primary object of this invention to improve the art of handles of the type used to provide hand holds on an exterior surface of a hull of a watercraft for a person positioned in a bod of water.

A more specific object is to advance the art of suction cups.

These and other important objects, features, and advantages c the invention will become apparent as this description proceeds.

The invention accordingly comprises the features of construction, combination of elements and arrangement of parts the will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
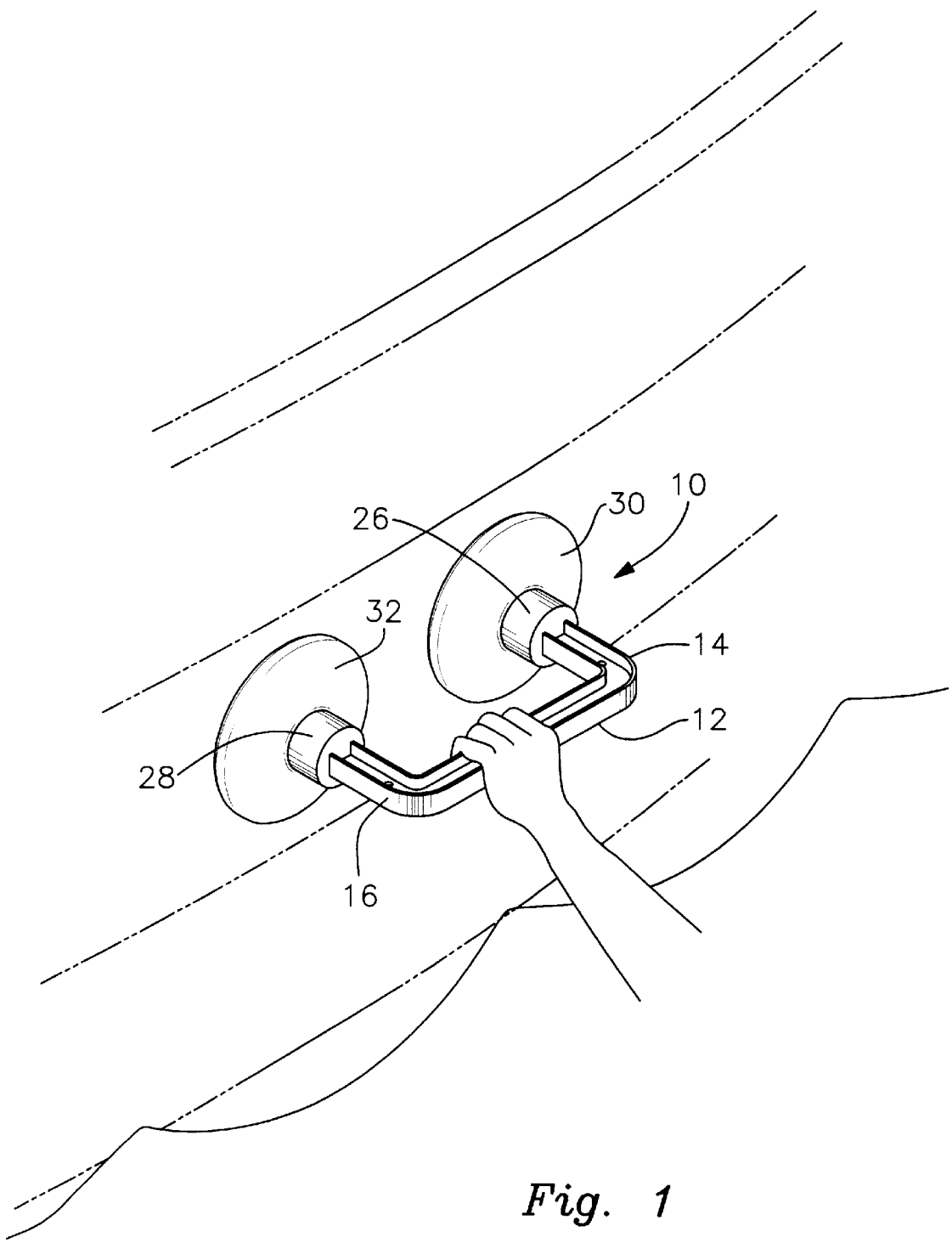
FIG. 1 is a perspective view depicting the novel handle in use.
Figure 2:
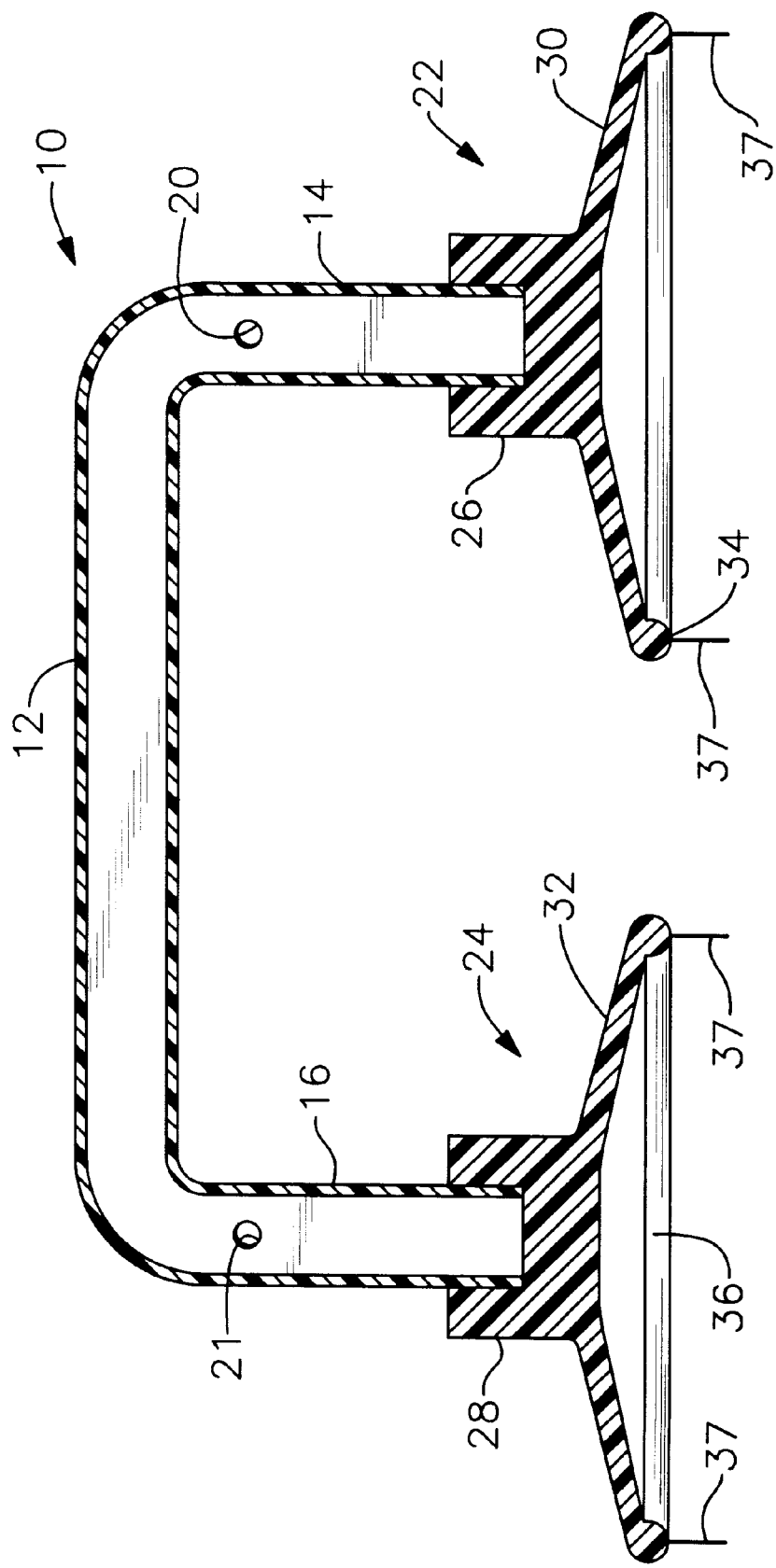
FIG. 2 s a sectional view depicting the structure of the novel suction cups.

Referring now to FIGS. 1 and 2, it will there be seen that an exemplary embodiment of the invention is denoted as a whole by the reference numeral 10.

Moveable handle 10, commercially sold under the trademark HOL-TITE®, includes a generally "C"-shaped handle having a straight central part 12 that provides a hand-gripping surface and a pair of transversely spaced apart, parallel arms 14, 16 integrally formed therewith that are bent normal thereto in a common direction. In a commercial embodiment, central part 12 is just slightly longer that the width of an adult human hand and is not as long as is depicted Loss of handle 10 is avoided by tying it to a user's wrist. A first end of a cord, not shown, is tied to the wrist and a second end thereof is tied to handle 10 at aperture 20 or 21.

As depicted in FIG. 2, suction cups 22, 24 include boss members 26, 28 having blind bores formed therein to respectively accommodate the distal free ends of parallel arms 14, 16.

Boss members 26, 28 are respectively integrally formed with convex side of suction cup bases 30, 32.

An O-ring 34, 36 is integrally formed with each base, on a concave side thereof, and circumscribes the outer peripheral edge thereof. Alternatively, a separately formed O-ring, not shown, is adhered to the concave side of each of said bases. Whether integrally or separately formed, the O-ring is disposed in overlying, centered relation to the annular peripheral edge of the suction cup, as indicated in FIG. 2 by center lines, collectively denoted 37, that extend longitudinally from the annular peripheral edge of each suction cup.

The addition of O-rings 34, 36 increases the strength of the vacuum that holds the suction cups to the hull of a boat or other watercraft because it increases the volume of air captured when the suction cups are first applied to the hull, relative to the volumetric capacity of conventional suction cups.

In other words, the O-ring increases the depth of the concavity defined by the concave side of the suction cup.

Moreover, the sealing effectiveness of an O-ring is greater than the sealing effectiveness of a featheredge edge as found in conventional suction cups.

This invention represents a major breakthrough in the art of moveable handles for holding onto the side of boats.

Being drawn to a pioneering invention, the claims that follow are entitled, as a matter of law, to broad interpretation to protect the heart or essence of the invention from piracy.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of th invention which, as a matter of language,. might be said to fall therebetween.

Now that the invention has been described,
What is claimed is:

1. A handle that enables a person in :a body of water to hold onto an exterior surface of a hull of a watercraft, comprising:

a straight central part;

a pair of transversely spaced apart, parallel arms that are perpendicular to the central part and which extend from the central part in a common direction;

a pair of suction cups, each suction cup of said pair having a convex side and a concave side;

each of said parallel arms having a distal free end that engages a suction cup on its convex side;

each suction cup having an annular peripheral edge, said annular peripheral edge circumscribing a concavity on said concave side of said suction cup;

an O-ring secured to each suction cup on its concave side in overlying, centered relation to said annular peripheral edge;

whereby the O-ring increases the volumetric capacity of the suction cup and therefor, increases the strength of the vacuum that holds the suction cups to the watercraft.

2. The device of claim 1, wherein each O-ring is integrally formed with its associated suction cup.

3. The device of claim 1, wherein each O-ring is secured to its associated suction cup.

* * * * *